(12) United States Patent
Uehara (10) Patent No.: US 10,033,058 B2
(45) Date of Patent: Jul. 24, 2018

(54) FUEL CELL

(71) Applicant: Shigetaka Uehara, Kamakura (JP)

(72) Inventor: Shigetaka Uehara, Kamakura (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 14/885,120

(22) Filed: Oct. 16, 2015

(65) Prior Publication Data
US 2016/0111746 A1  Apr. 21, 2016

Related U.S. Application Data

(62) Division of application No. 13/393,511, filed as application No. PCT/JP2011/052586 on Feb. 8, 2011, now Pat. No. 9,190,692.

(30) Foreign Application Priority Data

Mar. 17, 2010  (JP) .................. 2010-060363

(51) Int. Cl.
  *H01M 8/10* (2016.01)
  *H01M 8/24* (2016.01)
  (Continued)

(52) U.S. Cl.
  CPC ....... *H01M 8/1004* (2013.01); *H01M 8/0247* (2013.01); *H01M 8/0267* (2013.01);
  (Continued)

(58) Field of Classification Search
  CPC ....... H01M 2008/1095; H01M 8/0247; H01M 8/0273; H01M 8/1004; H01M 8/242; H01M 8/248; Y02E 60/50
  See application file for complete search history.

(56) References Cited

U.S. PATENT DOCUMENTS 6,794,079 B2  9/2004  Inagaki et al.
7,276,310 B2  10/2007  Kobayashi et al.
(Continued)

FOREIGN PATENT DOCUMENTS

CN  1379919 A  11/2002
EP  1 246 281 A1  10/2002
(Continued)

OTHER PUBLICATIONS

Machine translation of Japanese Patent Publication No. JP 2009/004230, published Jan. 8, 2009.*
(Continued)

*Primary Examiner* — Sarah A. Slifka
*Assistant Examiner* — Lilia Nedialkova
(74) *Attorney, Agent, or Firm* — Foley & Lardner LLP (57) ABSTRACT

Provided is a fuel cell capable of maintaining an interface pressure in good condition between a membrane electrode assembly and separators, and preventing an increase in contact resistance. A fuel cell is disclosed including: a membrane electrode assembly provided with a frame at a periphery thereof; two separators holding both the frame and the membrane electrode assembly therebetween; and a gas seal provided between an edge portion of the frame and an edge portion of each separator to have a configuration in which a reactant gas passes through the frame and the membrane electrode assembly and the separators, wherein the frame and the separators are not in contact with and separated from each other in a region between the membrane electrode assembly and the gas seal.

13 Claims, 7 Drawing Sheets

(51) Int. Cl.

| | |
|---|---|
| *H01M 8/1004* | (2016.01) |
| *H01M 8/0267* | (2016.01) |
| *H01M 8/2483* | (2016.01) |
| *H01M 8/0247* | (2016.01) |
| *H01M 8/0273* | (2016.01) |
| *H01M 8/242* | (2016.01) |
| *H01M 8/248* | (2016.01) |
| *H01M 8/1018* | (2016.01) |

(52) U.S. Cl.
 CPC ......... *H01M 8/0273* (2013.01); *H01M 8/242* (2013.01); *H01M 8/248* (2013.01); *H01M 8/2483* (2016.02); *H01M 2008/1095* (2013.01); *Y02E 60/50* (2013.01)

(56) References Cited

U.S. PATENT DOCUMENTS

| | | |
|---|---|---|
| 7,771,885 B2 | 8/2010 | Morimoto et al. |
| 7,790,329 B2 | 9/2010 | Morimoto et al. |
| 7,794,892 B2 | 9/2010 | Morimoto et al. |
| 2002/0192532 A1 | 12/2002 | Inagaki et al. |
| 2009/0023029 A1* | 1/2009 | Matsumoto ......... H01M 8/0258 429/434 |
| 2009/0029228 A1 | 1/2009 | Shibata et al. |
| 2009/0029230 A1* | 1/2009 | Shirahama .......... H01M 8/0247 429/404 |
| 2009/0136811 A1* | 5/2009 | Kusakabe ........... H01M 8/0273 429/492 |
| 2009/0202884 A1 | 8/2009 | Morimoto et al. |
| 2009/0226782 A1 | 9/2009 | Morimoto et al. |
| 2009/0233131 A1 | 9/2009 | Morimoto et al. |
| 2009/0291350 A1 | 11/2009 | Ishida et al. |
| 2010/0003568 A1 | 1/2010 | Sugawara et al. |
| 2010/0196774 A1 | 8/2010 | Kawabata et al. |
| 2011/0318665 A1 | 12/2011 | Yamamoto et al. |

FOREIGN PATENT DOCUMENTS

| | | | |
|---|---|---|---|
| EP | 1 465 272 A2 | 10/2004 | |
| EP | 2 058 883 A1 | 5/2009 | |
| EP | 2 405 516 A1 | 1/2012 | |
| JP | 2003-077499 A | 3/2003 | |
| JP | 2007-005215 A | 1/2007 | |
| JP | 2007-035296 A | 2/2007 | |
| JP | 2008-177001 A | 7/2008 | |
| JP | 2009004230 A * | 1/2009 | |
| JP | 2009-076470 A | 4/2009 | |
| JP | 2009-104882 | 5/2009 | |
| JP | 2009-104987 A | 5/2009 | |
| JP | 2010-129342 A | 6/2010 | |
| JP | 2010-272474 A | 12/2010 | |
| WO | WO 2009144871 A1 * | 12/2009 | .......... H01M 8/0247 |

OTHER PUBLICATIONS

Chinese Office Action, dated Nov. 25, 2013, 6 pages.
Chinese Office Action, dated Nov. 25, 2013, 15 pages.
European Search Report, dated Mar. 24, 2014, 9 pages.
Japanese Office Action, dated Sep. 9, 2013, 5 pages.

* cited by examiner

FUEL CELL

CROSS REFERENCE TO RELATED APPLICATIONS

This application is a divisional of U.S. application Ser. No. 13/393,511, filed Feb. 29, 2012, which is the National Stage of Application No. PCT/JP2011/052586 filed on Feb. 8, 2011, which claims benefit of priority from the prior Japanese Application No. 2010-060363, filed on Mar. 17, 2010; the entire contents of all of which are incorporated herein by reference.

TECHNICAL FIELD

The present invention relates to a fuel cell used as a power generation element of a fuel battery, more particularly to a plurality of fuel cells stacked on top of each other to compose a fuel cell stack.

BACKGROUND ART

For example, one of such fuel cells is described in Patent Literature 1. The fuel cell described in Patent Literature 1 includes a membrane electrode assembly (MEA) in which an electrolyte layer is held between a fuel electrode layer and an air electrode layer, a resin frame holding the periphery of the membrane electrode assembly, and two separators holding the membrane electrode assembly and the frame therebetween.

The fuel cell has a configuration in which manifolds and rectifying sections for reactant gas are provided between the frame and the separators so that reactant gas (fuel gas and oxidant gas) passes through the membrane electrode assembly. The separators have a gas sealing function for the reactant gas, and are also used as a current collector or an external terminal. A plurality of such fuel cells are stacked on top of each other to compose a fuel cell stack.

CITATION LIST

Patent Literature

Patent Literature 1: Japanese Patent Unexamined Publication No. 2003-077499

SUMMARY OF THE INVENTION

Technical Problem

In the case of composing a fuel cell stack by such fuel cells described above, the fuel cell stack is pressurized in a stacking direction in order to maintain assembling accuracy, a gas sealing property, and electrical conductivity in good condition. In conventional fuel cells, separators are in contact with both a membrane electrode assembly and a resin frame. Therefore, at the time of pressurization of a fuel cell stack, the contact portions between the resin frame and the separators are also pressurized. As a result, an interface pressure between the membrane electrode assembly and the respective separators is decreased (namely, a so-called pressure relief is caused). In particular, the problem of a pressure relief becomes prominent with decrease in thickness of the respective membrane electrode assembly and separators to downsize the fuel cell stack. Accordingly, in such conventional fuel cells, a problem of an increase in contact resistance between a membrane electrode assembly and each separator is caused. Thus, a measure for such a problem has been sought.

The present invention has been made in view of such a conventional problem. It is an object of the present invention to provide a fuel cell including a membrane electrode assembly provided with a frame at the periphery thereof, and two separators holding the frame and the membrane electrode assembly therebetween, so that, in the case of composing a fuel cell stack by plural fuel cells, an interface pressure between the membrane electrode assembly and the separators is maintained in good condition and an increase in contact resistance is prevented.

Solution to Problem

A fuel cell according to the present invention includes: a membrane electrode assembly provided with a frame at a periphery thereof; two separators holding both the frame and the membrane electrode assembly therebetween; and a gas seal provided between an edge portion of the frame and an edge portion of each separator to have a configuration in which a reactant gas passes through the frame and the membrane electrode assembly and the separators. The fuel cell has a configuration in which the frame and the separators are not in contact with and separated from each other in a region between the membrane electrode assembly and the gas seal, whereby a conventional problem is solved.

The fuel cell is characterized in that, as a more preferable embodiment, convex portions are provided on at least one of surfaces of the frame and the respective separators facing each other, and gaps are provided between the convex portions and opposed portions thereto. In order not to prevent a flow of a reactant gas to the membrane electrode assembly (the MEA section excluding the frame), it is necessary that the convex portions provided on the frame and the separators are not in contact with each other and gaps are provided between the convex portions and the opposed portions thereto.

Advantageous Effects of the Invention

According to the fuel cell of the present invention, the frame and the respective separators are separated from each other in the region between the membrane electrode assembly and the gas seal. Therefore, in the case of composing the fuel cell stack by stacking the plural fuel cells, a pressure applied in a stacking direction effectively acts between the membrane electrode assembly and the respective separators. Accordingly, an interface pressure between the membrane electrode assembly and the respective separators can be maintained in good condition, and an increase in contact resistance can be prevented.

DESCRIPTION OF THE EMBODIMENTS

A description will be made below of a fuel cell according to embodiments of the present invention with reference to the drawings.

Figure 1:
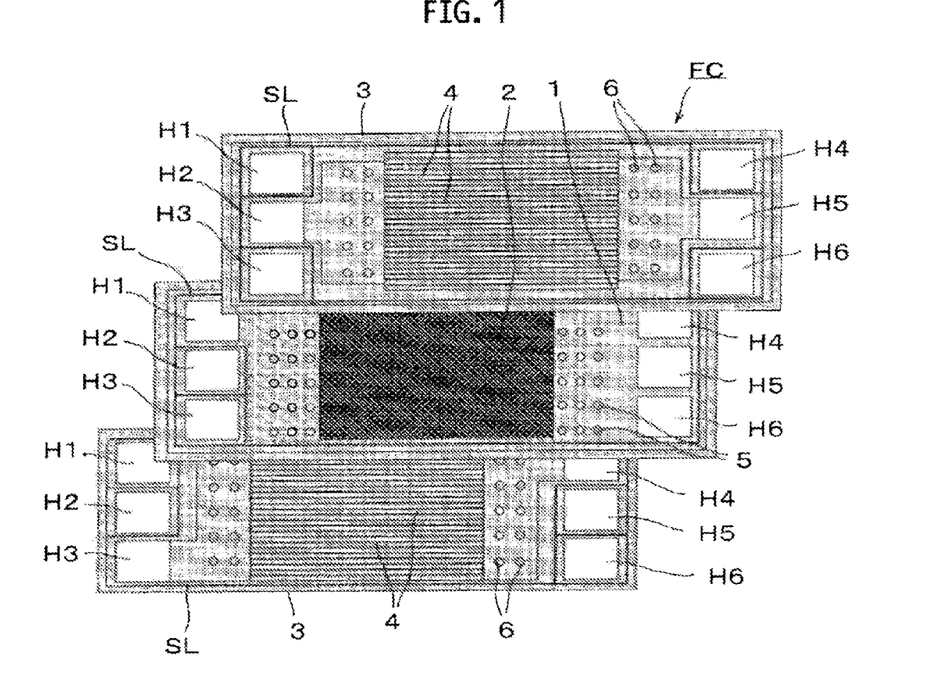
FIG. 1 is a plan view explaining a fuel cell in a separated state according to an embodiment of the present invention.
Figure 2:
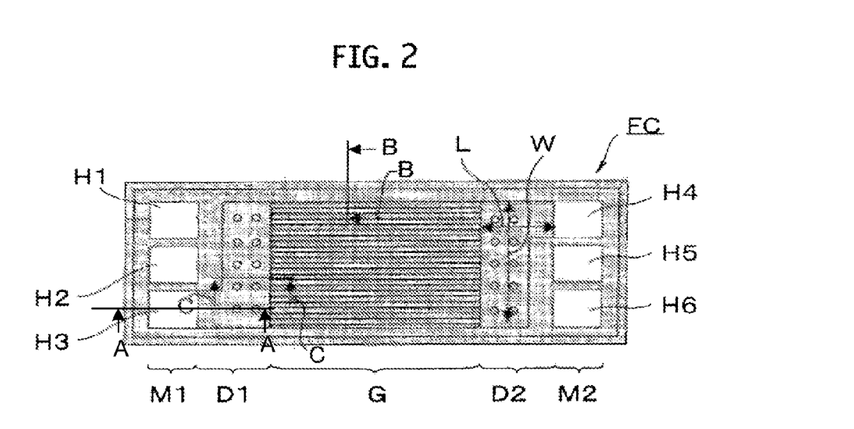
FIG. 2 is a plan view of a fuel cell.

A fuel cell FC shown in FIG. 1 and FIG. 2 includes a membrane electrode assembly 2 provided with a frame 1 at the periphery thereof, and two separators 3, 3 holding both the frame 1 and the membrane electrode assembly 2. The frame 1 is formed into a thin plate having approximately an even thickness, and most of the frame 1 excluding the edge thereof is thinner than the membrane electrode assembly 2. In addition, a gas seal is provided between the edge portion of the frame 1 and the edge portion of each separator 3 so that a reactant gas passes through the frame 1 and the membrane electrode assembly 2 and the separators 3, 3. The frame 1 is preferably made of resin and the separators 3, 3 are preferably made of metal in view of ease of manufacture.

Figure 3:
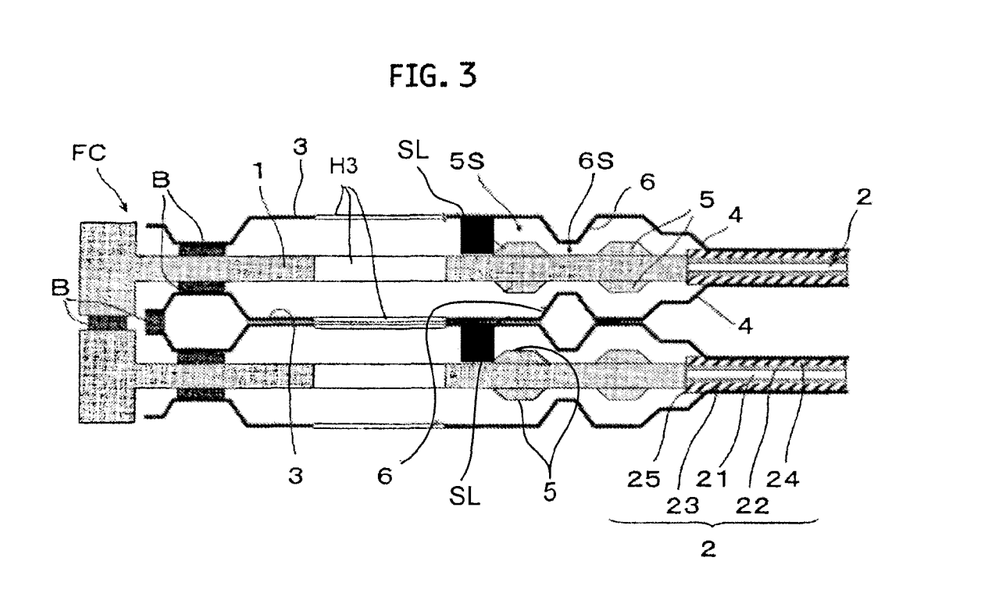
FIG. 3 is a cross-sectional view taken along the line A-A in FIG. 2.
Figure 4:
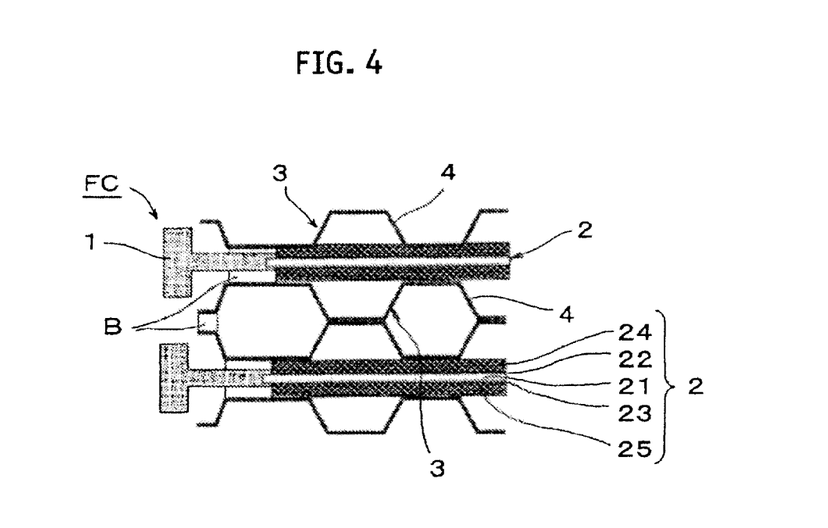
FIG. 4 is a cross-sectional view taken along the line B-B in FIG. 2.

The membrane electrode assembly 2 generally referred to as an MEA has a configuration in which an electrolyte layer 21 including, for example, a solid polymer is held between a fuel electrode layer (anode) 22 and an air electrode layer (cathode) 23, as shown in FIG. 3 and FIG. 4. In addition, the membrane electrode assembly 2 shown in the figures is provided with gas diffusion layers 24, 25 including a carbon paper or a porous body stacked on the fuel electrode layer 22 and the air electrode layer 23, respectively.

In the membrane electrode assembly 2, fuel gas (hydrogen) as one reactant gas is supplied to the fuel electrode layer 22 and oxidant gas (air) as another reactant gas is supplied to the air electrode layer 23 so that a chemical reaction is caused to generate power. Here, the membrane electrode assembly 2 may only include the electrolyte layer 21, the fuel electrode layer 22 and the air electrode layer 23, excluding the gas diffusion layers.

The frame 1 is integrated with the membrane electrode assembly 2 by resin molding (for example, injection molding). In the present embodiment, the frame 1 and the membrane electrode assembly 2 are formed into a rectangular shape in such a manner that the membrane electrode assembly 2 is located in the central region. The frame 1 includes manifolds H1 to H6 on both sides, each of which is provided with three manifolds. The area between each group including three manifolds and the membrane electrode assembly 2 is provided as a rectifying area (or diffusion area) for a reactant gas. Both the frame 1 and the respective separators 3, 3 have a rectangular shape with approximately the same dimension.

Each separator 3 is made of a metal plate such as stainless steel and formed by press molding. As shown in FIG. 3 and FIG. 4, each separator 3 is formed into a wave shape in cross-section in a short side direction in the central portion corresponding to the membrane electrode assembly 2. The wave shape configuration is continued in a long side direction. Accordingly, the convex portions in the wave shape of each separator 3 are in contact with the membrane electrode assembly 2 in the central portion corresponding to the membrane electrode assembly 2, and the concave portions in the wave shape function as a flow path for a reactant gas. In particular, the respective convex portions are ribs 4 of which the tips are in contact with the membrane electrode assembly 2. In each separator 3, the concave portions and the convex portions have a mutual converse relation in the front and back sides. Thus, the side facing the membrane electrode assembly 2 is defined as the front side in each separator 3, and the convex portions on the front side are defined as the ribs 4.

Each separator 3 also includes manifolds H1 to H6 on both sides thereof corresponding to the manifolds H1 to H6 of the frame 1, respectively. In addition, the area between each group including three manifolds and the region formed into a wave shape in cross-section is provided as a rectifying area (or diffusion area) for a reactant gas.

The frame 1 and the membrane electrode assembly 2 are held between the respective separators 3, 3 to form the fuel cell FC. The fuel cell FC in particular includes a power generation section G in the central portion thereof corresponding to the region of the membrane electrode assembly 2 as shown in FIG. 2, in which the membrane electrode assembly 2 is thicker than the frame 1. However, the frame 1 is not necessarily thinner than the membrane electrode assembly 2. Both sides of the power generation section G are provided with manifold sections M1 and M2, respectively, to supply and emit a reacting gas, and diffuser sections D1 and D2 to function as a rectifying area (or diffusion area) for a reactant gas provided between the respective manifold sections M1 and M2 and the power generation section G.

The manifold section M1 shown on the left side of FIG. 2 includes the respective manifolds H1 to H3 for supplying fuel gas (H1), supplying coolant (H2) and supplying oxidant gas (H3), each of which forms a flow path m a stacking direction. The manifold section M2 shown on the right side of FIG. 2 includes the respective manifolds H4 to H6 for emitting fuel gas (H4), emitting coolant (H5) and emitting oxidant gas (H6), each of which forms a flow path in a stacking direction. The positional relationship between the manifold section for supply and the manifold section for emission may be changed partly or entirely.

As described above, the fuel cell FC includes the power generation section G, the manifold sections M1 and M2, and the diffuser sections D1 and D2, in which the ratio of a flow path width W to a length L (W/L) in the respective diffuser sections D1 and D2 is set to 5 or less in the flow direction of a reactant gas as shown in FIG. 2. The flow path width W and the length L indicated in the diffuser section D2 for emission in FIG. 2 are also applied to the diffuser section D1 for supply as well. Accordingly, fuel gas and oxidant gas supplied from the manifolds H1 and H3 for supply are rectified (or diffused), so that these gases can be supplied to the entire membrane electrode assembly 2 evenly, and the rest of the fuel gas and oxidant gas having passed through the membrane electrode assembly 2 can be smoothly introduced into the manifolds H4 and H6 for emission.

In the fuel cell FC, a gas seal is provided between the edge portion of the frame 1 and the edge portion of each separator 3. In other words, the fuel cell FC uses an adhesive agent B to seal the respective edge portions of the frame 1 and the separators 3 as shown in FIG. 3 and FIG. 4. In the stacked state of the plural fuel cells, the frames 1 adjacent to each other and the separators 3 adjacent to each other are also sealed with the adhesive agent B. The present embodiment has a configuration to allow a coolant fluid to pass between the separators 3 adjacent to each other. In the case in which the separators 3 have a function as a current collector or an external terminal, an insulator may be provided between the separators 3 adjacent to each other in some cases.

The gas seal by the adhesive agent B described above separates the respective flow areas of the fuel gas, oxidant gas and coolant between the respective layers to be tightly sealed. That is, in the example shown in FIG. 1, the upper surface of the lower separator 3 (and the lower surface of the frame) is provided with a seal line SL to introduce the oxidant gas into the air electrode layer 23 of the membrane electrode assembly 2. In addition, the upper surface of the frame 1 (and the lower surface of the upper separator) is provided with a seal line SL to introduce the fuel gas into the fuel electrode layer 22 of the membrane electrode assembly 2. Further, the upper surface of the upper separator 3 is provided with a seal line SL to circulate the coolant. The gas seal may be an adhesive seal, may be a solid seal such as a gasket, or may employ both the adhesive seal and the solid seal.

Figure 5:
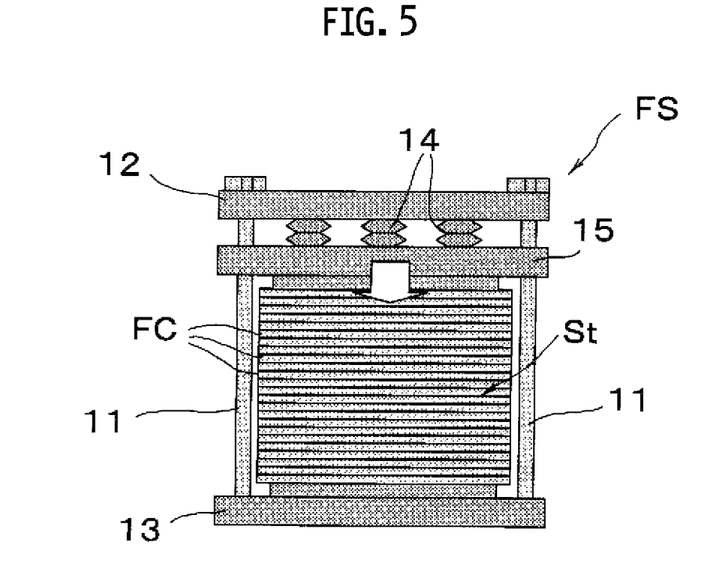
FIG. 5 is a side view explaining a fuel cell stack.

As shown in FIG. 5, the plural layers of the fuel cells FC including the above-described configuration are stacked on top of each other to compose a fuel cell stack FS. The fuel cell stack FS includes a stacked body St composed of the plural fuel cells FC stacked on top of each other, plural holding rods 11, and upper and lower end plates 12 and 13 held by the holding rods 11 provided therebetween, in which the stacked body St is provided between the upper and lower end plates 12 and 13. In addition, spring members 14 and an intermediate plate 15 are provided between the stacked body St and the upper end plate 12, so as to keep the stacked body St in a pressurized state in a stacking direction indicated by an arrow in the figure. Accordingly, a predetermined interface pressure is applied to each of the fuel cells FC to maintain a gas sealing property and electrical conductivity in good condition.

Thus, each fuel cell FC has a configuration in which the frame 1 and the separators 3 are not in contact with and separated from each other in the region between the membrane electrode assembly 2 and the gas seal (SL). Namely, the frame 1 and the separators 3 are separated from each other in the entire areas of the diffuser sections D1 and D2 that are the rectifying areas for a reactant gas to form gaps for the flow paths of the reactant gas.

Figure 6:
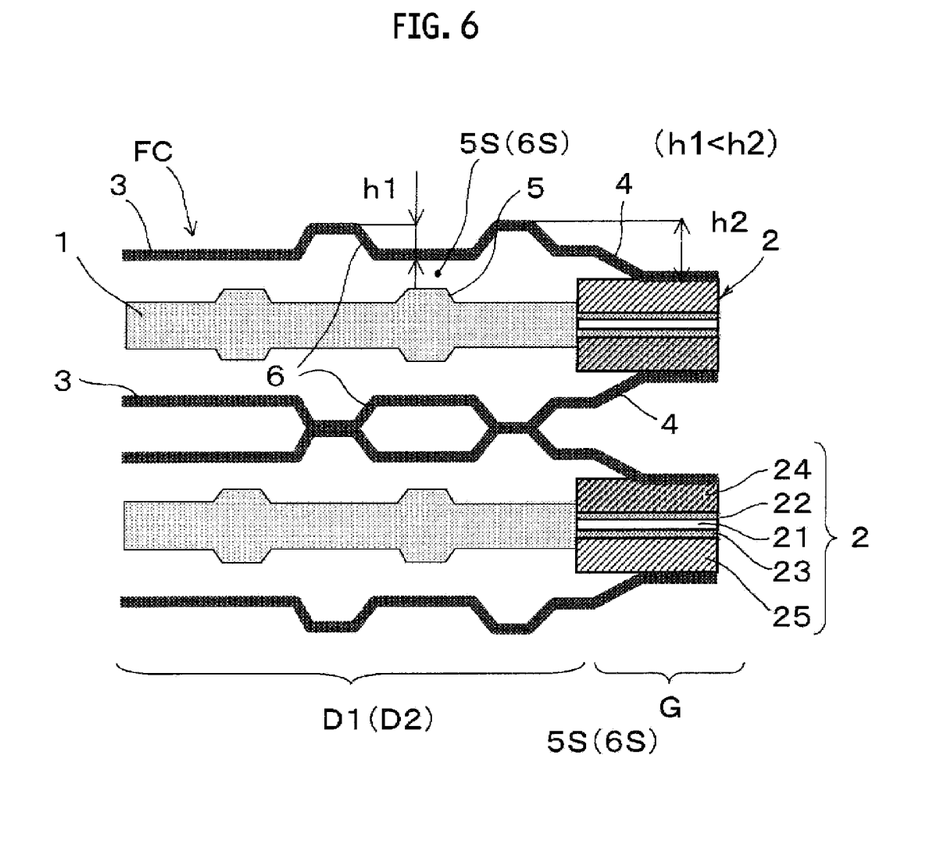
FIG. 6 is a cross-sectional view taken along the line C-C in FIG. 2.

More specifically, as shown in FIG. 6, the fuel cell FC is provided with convex portions 5 and 6 on each surface of the frame 1 and the respective separators 3 in such a manner that the convex portions 5 and 6 of the frame 1 and the respective separators 3 face each other. In addition, gaps 5S and 6S are provided between the respective convex portions 5 and 6 facing each other. The configuration of the respective convex portions 5 and 6 are not particularly limited. In the example shown in the figure, both the convex portions 5 and 6 are formed into a circular truncated cone, and arranged at predetermined intervals in horizontal and vertical directions.

The convex portions 5 of the frame 1 and the convex portions 6 of the separators 3 are alternately arranged as shown in FIG. 3, or arranged to face each other as shown in FIG. 6. In either case, the gaps 5S and 6S are provided between the frame 1 and the separators 3.

As described above, in the respective separators 3, the concave portions and the convex portions have a mutual converse relation in the front and back sides. Thus, the side facing the membrane electrode assembly 2 is defined as the front side in each separator 3, in which the convex portions 6 are provided on the front side. Note that, although the respective separators 3 shown in FIG. 3 and FIG. 6 have partly different shapes from each other, the fundamental configurations of the convex portions 5 and 6, including the frame 1 are the same in FIG. 3 and FIG. 6.

In the fuel cell FC, the separators 3 include the convex portions 6 facing the frame 1, and the above-described ribs 4 of which the tips are in contact with the membrane electrode assembly 2. When the height of the convex portion 6 is defined as h1, and the height from the bottom of the convex portion 6 to the tip of the rib 4 (the height of the rib 4) is defined as h2, as shown in FIG. 6, the relationship of the height h1 to the height h2 is set to h1<h2. In this case, the frame 1 is thinner than the membrane electrode assembly 2 as described above.

In addition, the fuel cell FC has a configuration in which the gaps 5S and 6S between the convex portions 5 and 6 and the respective opposed portions thereto are larger than the decreased thickness of the membrane electrode assembly 2 caused by deterioration with time. This configuration is ensured to maintain the gaps 5S and 6S against the deterioration with time of the membrane electrode assembly 2. The amount of decrease in thickness of the membrane electrode assembly 2 can be obtained by experiment or the like. A more stable configuration to maintain the gaps 5S and 6S is obtained by adjusting the dimensions of the gaps 5S and 6S to have a thickness approximately the same as the membrane electrode assembly 2.

In the fuel cell FC including the above-described configuration, the frame 1 and the separators 3 are not in contact with and separated from each other in the areas between the membrane electrode assembly 2 and the gas seal (SL) (the diffuser sections D1 and D2). Therefore, in the case of composing the fuel cell stack FS, a pressure applied in a stacking direction effectively acts between the membrane electrode assembly 2 and the separators 3 without acting between the frame 1 and the separators 3. Accordingly, an interface pressure between the membrane electrode assembly 2 and the separators 3 can be maintained in good condition and at the same time, an increase in contact resistance can be prevented. In addition, since the pressure applied in a stacking direction constantly acts on the fuel cell stack FC, a contact condition between the membrane electrode assembly 2 and the separators 3 is maintained, and a pressure relief is not caused even if the thickness of the membrane electrode assembly 2 is decreased because of deterioration with time.

Further, the fuel cell FC has the relationship of the height h1 of the convex portions 6 to the height h2 of the ribs 4 that is set to h1<h2. Accordingly, the ribs 4 first come into contact with the membrane electrode assembly 2 at the time of stacking and therefore, the gaps S6 between the convex portions 6 and the opposed portions thereto can be ensured.

Figure 7:
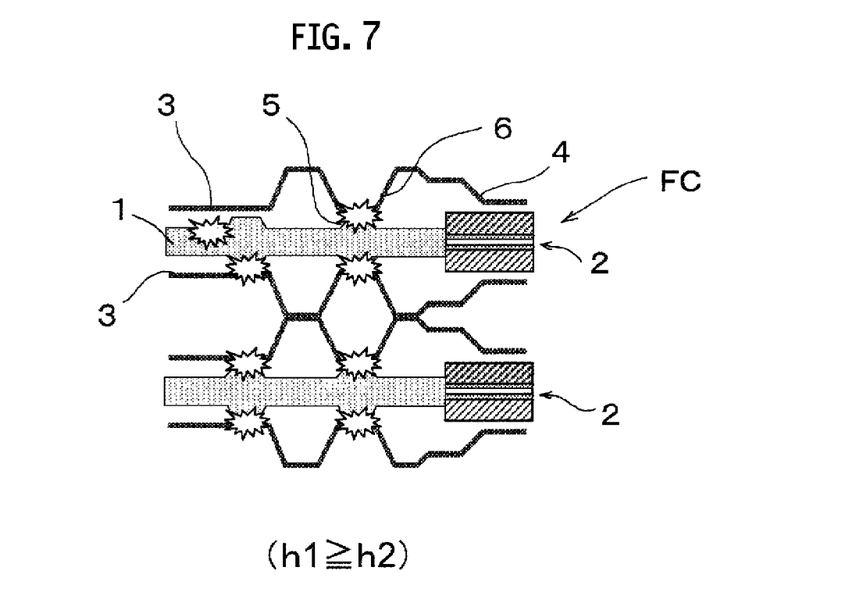
FIG. 7 is a cross-sectional view showing a case in which a height h1 of a convex portion is equal to or more than a height h2 of a rib.

Here, as shown in FIG. 7, in the case in which the respective thicknesses of the frame 1 and the membrane electrode assembly 2 are identical, and the relationship of the height h1 of the convex portions 6 to the height h2 of the ribs 4 is set to h1≥h2, the convex portions 6 come into contact with the frame 1 at the time of stacking. As a result, a pressure relief, which is a decrease in interface pressure between the membrane electrode assembly 2 and the separators 3, is caused to increase a contact resistance.

Meanwhile, in the fuel cell FC, the ribs 4 first come into contact with the membrane electrode assembly 2 so that the gaps 6S are ensured as described above. Therefore, an interface pressure between the membrane electrode assembly 2 and the separators 3 is maintained in good condition to prevent an increase in contact resistance. Accordingly, a contact resistance between the membrane electrode assembly 2 and the separators 3 is suppressed to lower levels so as to maintain an excellent battery performance.

In addition, in the fuel cell FC, the height h1 of the convex portions 6 in the separators 3 is set to less than the height h2 of the ribs 4 so that the heights of the diffusers D1 and D2 in the separators 3 are decreased. That is, in the case in which the separators 3 are made of metal and formed by press molding, the amount of processing is decreased due to such a configuration. As the amount of processing is decreased, implementation of complicated configurations such as a decrease in distance between the convex portions can be easily made.

Here, the distance between the convex portions is preferably set within an allowable range of load of an auxiliary device for a fuel cell such as a compressor to the extent that a pressure loss during gas flow is not increased.

Figure 8:
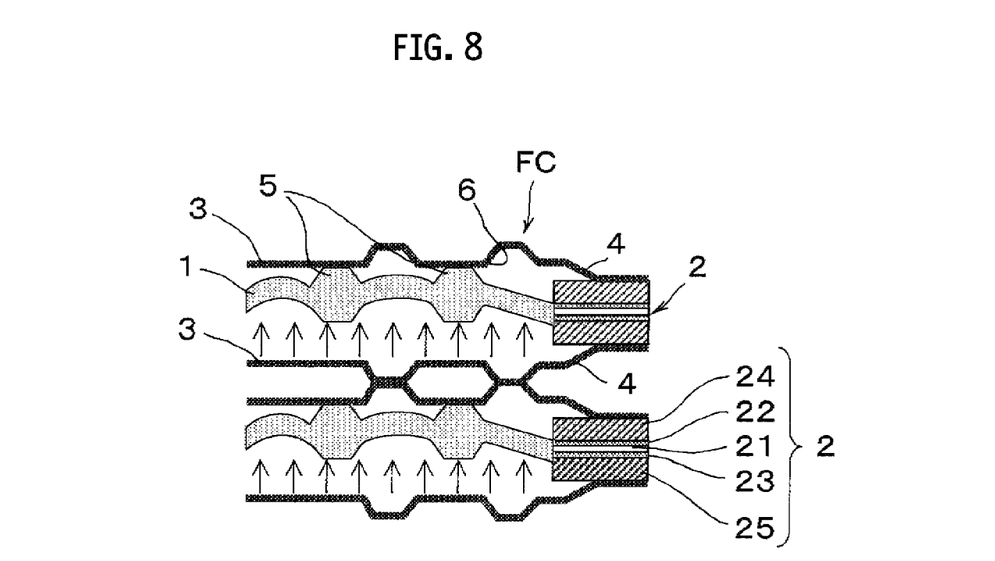
FIG. 8 is a cross-sectional view explaining a state in which a frame is deformed.

The fuel cell FC is also provided with the convex portions 5 and 6 on each surface of the frame 1 and the separators 3 facing each other, and provided with the gaps 5S and 6S between the convex portions 5 and 6 and the respective opposed portions thereto. Therefore, as shown in FIG. 8, even in the case in which the frame 1 is deformed because of a pressure difference between fuel gas and oxidant gas, the convex portions 5 and 6 come into contact with the opposed portions thereto so that further deformation of the frame 1 is prevented and at the same time, the flow paths of gas are ensured. In addition, the amount of displacement of the frame 1 is minimized due to the contact of the convex portions 5 and 6, and an effect of a decrease in load on the frame 1 is also obtained.

Figure 9A:
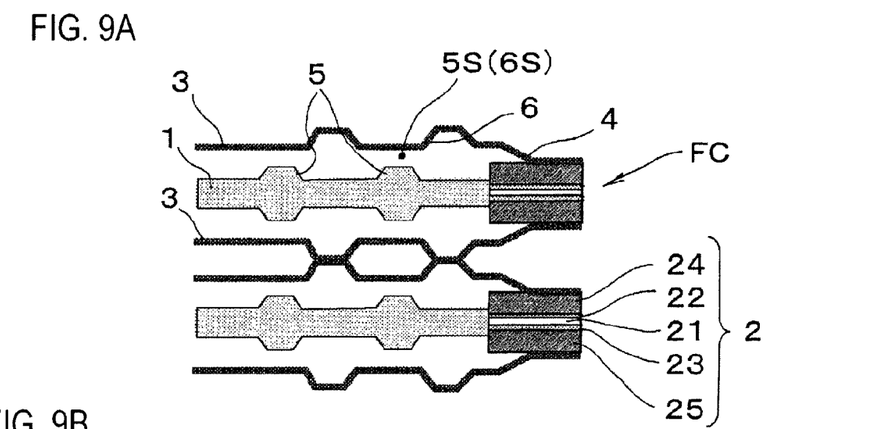
FIG. 9A is a cross-sectional view explaining a state of a membrane electrode assembly before deterioration.
Figure 9B:
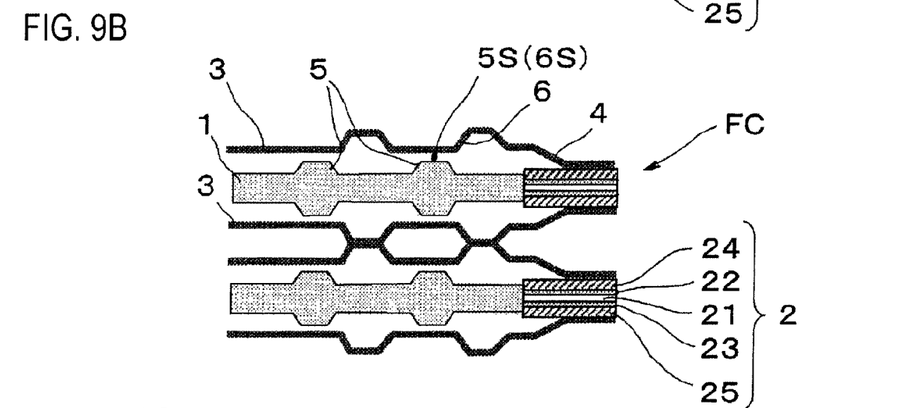
FIG. 9B is a cross-sectional view explaining a state after deterioration.

Moreover, the dimensions of the gaps 5S and 6S between the convex portions 5 and 6 and the respective opposed portions thereto are set to a larger value than the amount of decrease in thickness of the membrane electrode assembly 2 caused by deterioration with time. Thus, even if the thickness of the membrane electrode assembly 2 is decreased from the initial state shown in FIG. 9A to the state shown in FIG. 9B, the gaps 5S and 6S can be maintained. Accordingly, the interface pressure between the membrane electrode assembly 2 and the separators 3 is maintained in good condition to prevent an increase in contact resistance, and the functions such as reducing a load during deformation of the frame 1 and ensuring flow paths of gas can also be maintained.

The fuel cell FC shown in FIG. 3 has a configuration in which the convex portions 5 of the frame 1 and the convex portions 6 of the respective separators 3 are alternately arranged. Due to such a configuration, the gaps 5S and 6S between the frame 1 and the separators 3 can be substantially ensured, and the space for circulation of a reactant gas can be widely obtained even if, for example, the thickness of the membrane electrode assembly 2 is decreased because of deterioration with time or the frame 1 is deformed because of a pressure difference of the reactant gas.

The fuel cell FC shown in FIG. 6 has a configuration in which the convex portions 5 of the frame 1 and the convex portions 6 of the respective separators 3 are arranged to face each other. Due to such a configuration, in the case, for example, in which external stress is applied, the convex portions 5 and 6 temporarily come into contact with each other to function as a stopper, thereby preventing an entire deformation, preventing an excessive load from being put on the membrane electrode assembly 2, and providing a function to enhance mechanical strength in association with the ribs 4.

In addition, the fuel cell has a configuration in which the frame 1 and the membrane electrode assembly 2 are integrally formed by resin molding. Therefore, in addition to an improvement in production efficiency, the convex portions 5 can be easily formed into a complicated shape compared to the case of metal press molding.

The fuel cell stack FS formed in such a manner that the plural fuel cells FC described above are stacked on top of each other can maintain an interface pressure in good condition between the separators 3 and the membrane electrode assembly 2 and prevent an increase in contact resistance. Accordingly, an efficient power generation function can be ensured for a long period of time.

Figure 10:
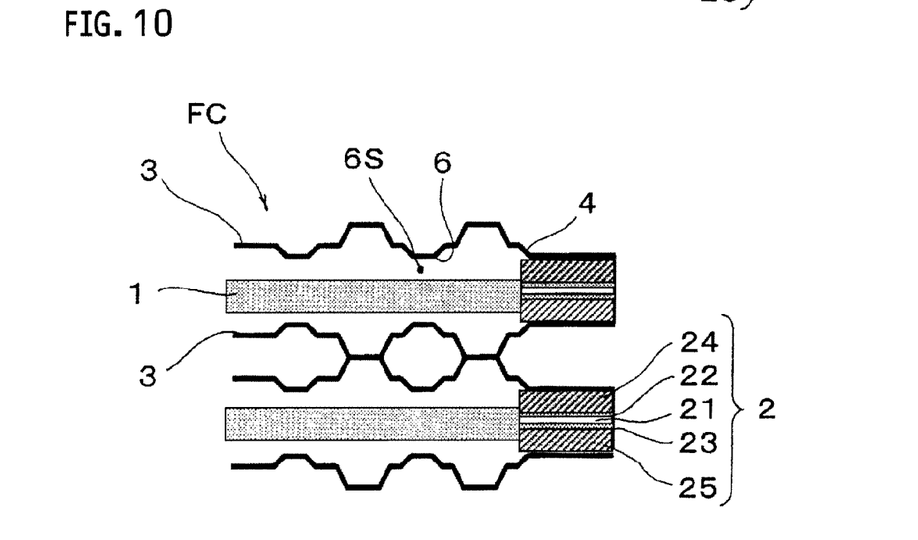
FIG. 10 is a cross-sectional view explaining a fuel cell according to another embodiment of the present invention.

FIG. 10 is a view explaining a fuel cell according to another embodiment of the present invention. The present embodiment has a configuration, with regard to the frame 1 and the separators 3, in which only the separators 3 are provided with the convex portions 6, and the gaps 6S are provided between the convex portions 6 and the opposed portions thereto.

According to the present invention, the convex portions may be provided on at least one of the surfaces of the frame and the separators facing each other, and the gaps may be provided between the convex portions and the opposed portions thereto. Therefore, the configuration in which only the separators 3 are provided with the convex portions 6 as shown in FIG. 10 or in which only the frame is provided with the convex portions (not shown in the figure) may be employed. In each case, the effects identical to those in the previous embodiment can be obtained.

Figure 11A:
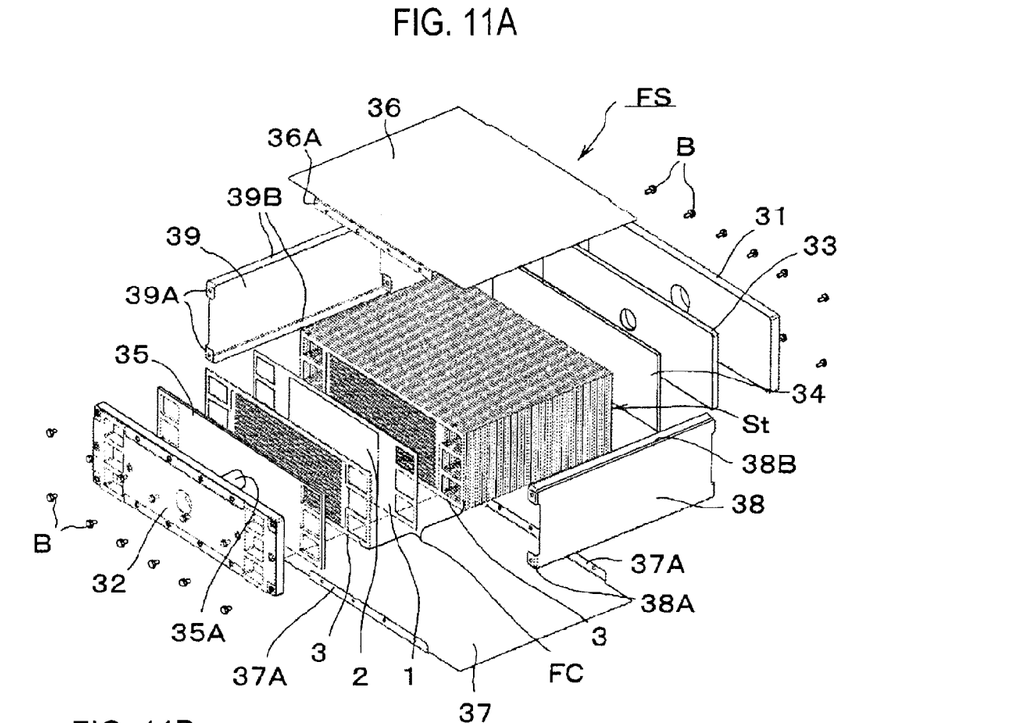
FIG. 11A is an exploded perspective view explaining a fuel cell stack.
Figure 11B:
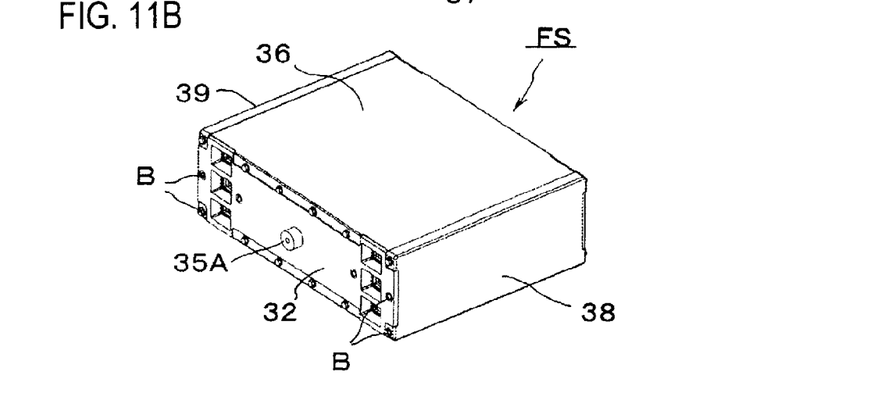
FIG. 11B is a perspective view of an assembled fuel cell stack, according to another embodiment of the present invention.

FIG. 11 is a view explaining a fuel cell stack FS according to another embodiment.

The fuel cell stack FS shown in the figure includes the stacked body St composed of the plural fuel cells FC stacked on top of each other. The respective fuel cells FC include the membrane electrode assembly 2 provided with the frame 1 at the periphery thereof, and the two separators 3, 3 holding both the frame 1 and the membrane electrode assembly 2 therebetween. The respective internal configurations of these elements are identical to those in each embodiment described above.

The fuel cell stack FS includes the stacked body St described above, and end plates 31 and 32 located on both sides of the stacked body St in the stacking direction thereof and attached to the stacked body St so that the stacked body St is pressurized in the stacking direction.

More specifically, the fuel cell stack FS is provided with the end plate 31 via a current collector 33 and a spacer 34 on one side (at a right end in FIG. 11) in the stacking direction of the stacked body St, and provided with the end plate 32 via a current collector 35 on the other side. The respective current collectors 33 and 35 include a connector 35A (shown only on one side in the figure) passing through the respective end plates 31 and 32.

In addition, the fuel cell stack FS includes fastening plates 36 and 37 provided at both surfaces on the long sides of the fuel cells FC (upper and lower surfaces), and includes reinforcing plates 38 and 39 provided at both surfaces on the short sides of the fuel cells FC.

The fastening plates 36 and 37 include flat main bodies having fixing pieces 36A and 37A for the outer surfaces of the end plates 31 and 32, respectively. The reinforcing plates 38 and 39 include flat main bodies having fixing pieces 38A and 39A for the outer surfaces of the end plates 31 and 32, and having holding members 38B and 39B for the fastening plates 36 and 37, respectively. The respective reinforcing plates 38 and 39 are fitted onto the sides of the stacked body St in such a manner that the holding members 38B and 39B are put on the edge portions of the fastening plates 36 and 37.

Thus, the fuel cell stack FS has a case-integrated configuration by attaching the respective fastening plates 36 and 37 and the respective reinforcing plates 38 and 39 to the respective end plates 31 and 32 by using an appropriate number of bolts B.

The fuel cell stack FS having the above-described configuration includes the fuel cells FC, each of which includes the frame 1 and the separators 3 separated from each other, and includes the stacked body St composed of such fuel cell stacks FC and held between the end plates 31 and 32. Accordingly, the contact interface pressure between the membrane electrode assembly 2 and the respective separators 3 can be constantly maintained in good condition, and the stacked body St can be kept in a pressurized state.

Namely, since the fuel cell stack FS includes the fuel cells FC each of which includes the frame 1 and the separators 3 separated from each other, an elastic force (repulsive force against pressurization) of the frame 1 in each fuel cell FC mutually acts on the adjacent fuel cells FC. Therefore, the fuel cell stack FS is in a state identical to a state in which the whole stacked body St is pressurized in a stacking direction. Thus, the pressurized state of the stacked body St can be maintained without using the spring members (14) of the fuel cell stack described in the explanation of FIG. 5. Accordingly, the above-described configuration can contribute to a decrease in the number of components and manufacturing processes, a decrease in production cost, and a reduction in size and weight.

The configurations of the fuel cells and the fuel cell stack according to the present invention are not limited to the above-described embodiments, and the configurations, the number and the raw materials of each element can be arbitrarily modified without departing from the scope of the present invention.

REFERENCE SIGNS LIST

1 Frame
2 Membrane electrode assembly
3 Separator
4 Rib
5, 6 Convex portion
5S, 6S Gap
31, 32 End plate
D1, D2 Diffuser section
FC Fuel cell
FS Fuel cell stack
G Power generation section
M1, M2 Manifold section
St Stacked body

The invention claimed is:

1. A fuel cell, comprising:
a membrane electrode assembly provided with a frame at a periphery thereof;
two separators holding both the frame and the membrane electrode assembly therebetween;
a gas seal provided between an edge portion of the frame and an edge portion of each separator to have a configuration in which a reactant gas passes through the frame and the membrane electrode assembly and the separators;
a manifold section included in the frame, the manifold section includes reactant gas manifold sections configured to supply or emit the reactant gas and a coolant manifold section configured to supply or emit a coolant; and
a diffuser section disposed between the manifold section and the membrane electrode assembly,
wherein the reactant gas manifold sections and the coolant manifold section are aligned,
wherein the frame and the separators are not directly in contact and are separated from each other at every position between the membrane electrode assembly and the gas seal,
wherein the frame and the separators are not directly or indirectly in contact and are separated from each other at every position of the diffuser section between the membrane electrode assembly and the gas seal,
wherein a plurality of protruding portions extending in a stacking direction of the frame and the separators are provided on surfaces of the frame and respective separator facing each other, and gaps are provided in the stacking direction between respective tips of the plurality of the protruding portions and opposed portions thereto in the diffuser section,
wherein the plurality of the protruding portions of the frame and the plurality of the protruding portions of the separators are alternately arranged in the diffuser section,
wherein the manifold sections configured to supply the reactant gas and the coolant manifold section configured to supply the coolant are aligned in a straight line with respect to one another, and
wherein the manifold sections configured to emit the reactant gas and the coolant manifold section configured to emit the coolant are aligned in a straight line with respect to one another.

2. The fuel cell according to claim 1, wherein the frame is integrated with the membrane electrode assembly by resin molding.

3. A fuel cell stack comprising a plurality of fuel cells according to claim 1, wherein the plurality of fuel cells are stacked on top of each other to form a stacked body, the stacked body being pressurized in the stacking direction.

4. The fuel cell stack according to claim 3, further comprising end plates located on both sides of the stacked body in the stacking direction, the end plates being attached to the stacked body so that the stacked body is pressurized in the stacking direction.

5. The fuel cell according to claim 1, wherein the frame and the separators are not directly in contact and are separated from each other at every position of a continuous space bounded by a length extending from the membrane electrode assembly to the gas seal and a height extending from a first separator to a second separator.

6. The fuel cell according to claim 5, wherein a ratio represented by the following formula, R=a flow path width of the reactant gas in the diffuser section/a flow path length in a flow direction, is 5 or less.

7. The fuel cell according to claim 1, wherein a ratio represented by the following formula, R=a flow path width of the reactant gas in the diffuser section/a flow path length in a flow direction, is 5 or less.

8. The fuel cell according to claim 1, wherein the diffuser section is configured to function as a diffusion area for the reactant gas between the manifold section and the membrane electrode assembly.

9. The fuel cell according to claim 1, wherein the plurality of protruding portions of the frame protrude in a direction extending towards the respective separator, and the tips of the plurality of the protruding portions of the frame are regions of the plurality of protruding portions that are closest to a corresponding separator in the stacking direction.

10. The fuel cell according to claim 1, wherein the plurality of protruding portions of the separators protrude in a direction extending towards the frame, and the tips of the plurality of the protruding portions of the separators are regions of the plurality of protruding portions that are closest to the frame in the stacking direction.

11. The fuel cell according to claim 1, wherein in the stacking direction protruding portions provided on surfaces of the frame are convex and extend towards an adjacent separator, and protruding portions provided on surfaces of the separators are convex and extend towards the frame.

12. A fuel cell, comprising:
a membrane electrode assembly provided with a frame at a periphery thereof;
two separators holding both the frame and the membrane electrode assembly therebetween;
a gas seal provided between an edge portion of the frame and an edge portion of each separator to have a configuration in which a reactant gas passes through the frame and the membrane electrode assembly and the separators;
a manifold section included in the frame, the manifold section includes reactant gas manifold sections configured to supply or emit the reactant gas and a coolant manifold section configured to supply or emit a coolant; and
a diffuser section disposed between the manifold section and the membrane electrode assembly,
wherein the reactant gas manifold sections and the coolant manifold section are aligned,
wherein the frame and the separators are not directly in contact and are separated from each other at every position between the membrane electrode assembly and the gas seal,
wherein the frame and the separators are not directly or indirectly in contact and are separated from each other at every position of the diffuser section between the membrane electrode assembly and the gas seal,
wherein a plurality of protruding portions extending in a stacking direction of the frame and the separators are provided on surfaces of the frame and respective separator facing each other, and gaps are provided in the stacking direction between respective tips of the plurality of the protruding portions and opposed portions thereto in the diffuser section,
wherein the plurality of the protruding portions of the frame and the plurality of the protruding portions of the separators are alternately arranged in the diffuser section, and
wherein the plurality of protruding portions of the separators protrude in a direction extending towards the frame, and the tips of the plurality of the protruding portions of the separators are regions of the plurality of protruding portions that are closest to the frame in the stacking direction.

13. A fuel cell, comprising:
a membrane electrode assembly provided with a frame at a periphery thereof;
two separators holding both the frame and the membrane electrode assembly therebetween;
a gas seal provided between an edge portion of the frame and an edge portion of each separator to have a configuration in which a reactant gas passes through the frame and the membrane electrode assembly and the separators;
a manifold section included in the frame, the manifold section includes reactant gas manifold sections configured to supply or emit the reactant gas and a coolant manifold section configured to supply or emit a coolant; and
a diffuser section disposed between the manifold section and the membrane electrode assembly,
wherein the reactant gas manifold sections and the coolant manifold section are aligned,
wherein the frame and the separators are not directly in contact and are separated from each other at every position between the membrane electrode assembly and the gas seal,
wherein the frame and the separators are not directly or indirectly in contact and are separated from each other at every position of the diffuser section between the membrane electrode assembly and the gas seal,
wherein a plurality of protruding portions extending in a stacking direction of the frame and the separators are provided on surfaces of the frame and respective separator facing each other, and gaps are provided in the stacking direction between respective tips of the plurality of the protruding portions and opposed portions thereto in the diffuser section,
wherein the plurality of protruding portions extending in the stacking direction of the frame and the separators are provided on surfaces of the frame and protrude in a direction extending towards the respective separator, and the tips of the plurality of the protruding portions of the frame are regions of the plurality of protruding portions that are closest to a corresponding separator in the stacking direction, and
wherein the plurality of protruding portions extending in the stacking direction of the frame and the separators are provided on surfaces of the separators and protrude in a direction extending towards the frame, and the tips of the plurality of the protruding portions of the separators are regions of the plurality of protruding portions that are closest to the frame in the stacking direction.

* * * * *